United States Patent

Kalinsky

[11] Patent Number: 5,947,250
[45] Date of Patent: Sep. 7, 1999

[54] THREADING CLUTCH

[75] Inventor: Robert Kalinsky, Broadview Heights, Ohio

[73] Assignee: Logan Clutch Coporation, Westlake, Ohio

[21] Appl. No.: 08/992,773

[22] Filed: Dec. 17, 1997

Related U.S. Application Data

[60] Provisional application No. 60/034,347, Dec. 23, 1996.

[51] Int. Cl.[6] ..................................................... F16D 19/00
[52] U.S. Cl. ..................................... 192/87.11; 192/87.17
[58] Field of Search .............................. 192/70.28, 87.17, 192/48.91; 74/665 B

[56] References Cited

U.S. PATENT DOCUMENTS

| | | | |
|---|---|---|---|
| 3,106,999 | 10/1963 | Snoy | 192/87.17 |
| 3,595,353 | 7/1971 | Beneke | 192/87.17 |
| 3,791,500 | 2/1974 | Stefanutti | 192/87.17 |
| 4,051,933 | 10/1977 | Beneke | 192/87.17 |
| 4,624,356 | 11/1986 | Hanks | 192/70.28 |

Primary Examiner—Charles A. Marmor
Assistant Examiner—Tisha D. Waddell
Attorney, Agent, or Firm—David R. Percio; Ralph E. Jocke

[57] ABSTRACT

A threading clutch apparatus (10) for a multiple spindle machine which allows for selective engagement of connected gears with a rotating shaft (12) which is connected to the threading clutch apparatus. The threading clutch apparatus includes a hub (14) which is positively connected with and rotates with the shaft (12), and a housing (18) which is supported from the hub via bearings (28 and 30). The threading clutch apparatus further includes a pair of pistons (48 and 66) which are positioned to communicate with a compressed fluid source. The threading clutch apparatus further includes a first and second plurality of friction disks (92 and 122) which are operably connected with the gears of the multiple spindle machine. When compressed fluid is communicated to a piston, the piston compresses the associated plurality of the friction disks which results in the positive engagement of the associated gear and rotation of the gear with the shaft.

18 Claims, 4 Drawing Sheets

THREADING CLUTCH

This application claims the benefit of U.S. Provisional Application No. 60/034,347 filed on Dec. 23, 1996.

TECHNICAL FIELD

This invention relates to clutches, particularly to air threading clutches for multiple spindle forming machines.

BACKGROUND ART

Multiple spindle machines are known in the prior art. Multiple spindle machines are used to mass produce standardized types of components. Multiple spindle machines typically have several workstations at which machining operations are performed. A piece of raw stock, such as bar stock, enters the machine at a first station and as the machine indexes, various machining operations are performed. Once a station is indexed completely through the machine a completed part is formed. The part is released and the process is repeated for that station with a new piece of raw stock. The advantage of multiple spindle machines is that all stations in the machine are producing parts simultaneously, resulting in high production.

Multiple spindle machines typically have a large indexing drum with four, six or eight stations thereon. Each of the stations carries a work piece. In all but one of the stations, where a new piece of stock enters, a machining operation is performed. After each operation is completed the drum is rotated so that each work space moves sequentially through the location where the various operation is performed. Machining operations typically performed at a multiple spindle machine include turning and threading.

Most multiple spindle machines are very efficient in terms of producing standardized parts at a high rate. However, one draw back associated with multiple spindle machines is that the entire machine often operates off of a single main motor. The main motor simultaneously drives all the devices in the machine.

The speed of the multiple spindle machine typically changes from high speed to low speed and back again during the course of the operating cycle. High speed is typically used for times in the machine cycle where critical machining operations are not occurring. High speed operation is desirable when the machines are indexing or when the tools are moving to or away from the work pieces that are not performing work thereon. Low speed operation is used when the tools in the machine are forming the metal. As stated, threading operation of the bar stock is performed utilizing a threading die which is driven via a worm gear. In the prior art multiple spindle machines, such as the National Acme 7/16th inch RA-6 bar machine, the worm gear is driven through a threading clutch. The threading clutch acts to translate rotation from a reversible shaft to the threading shaft.

Figure 1:
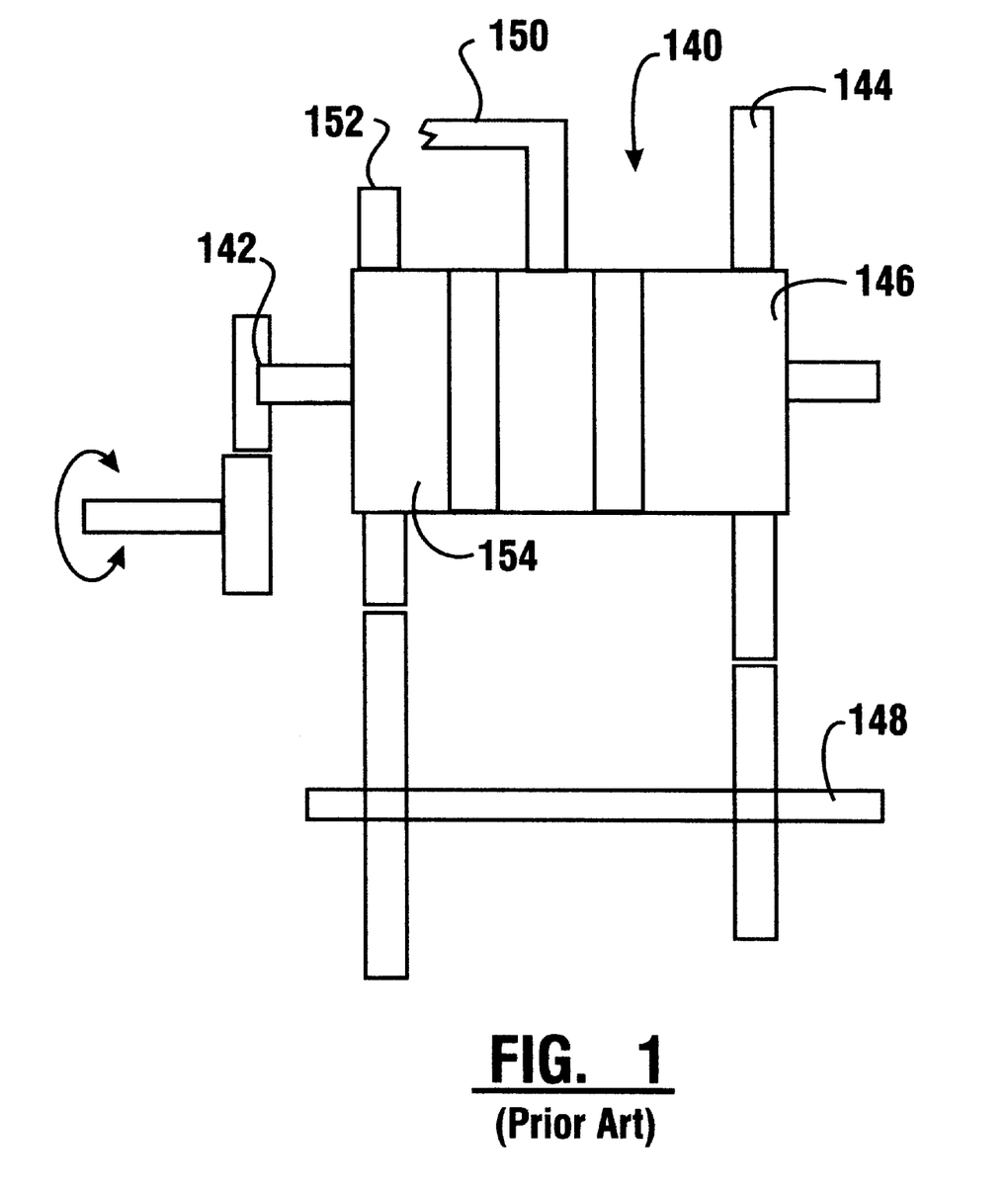
FIG. 1 is a side view of a section of the multiple spindle machine showing the positioning and orientation of the threading clutch machine of the present invention.

Referring now to FIG. 1, there is shown a prior art threading clutch 140 which is arranged generally surrounding a drive shaft 142. The drive shaft is operable through gearing to be rotated at high speeds in a forward and a reverse direction. The threading clutch is operable to selectively engage a connected gear with the drive shaft 142. In FIG. 1, threading clutch 140 is operable to engage high speed gear 144 through drive cup 146 with the threading shaft 148 when pressurized fluid is supplied via conduit 150. When the drive shaft is rotated in the forward direction the threading clutch is operable to translate the rotation of the drive shaft 142 to the reducing gear 152 through drive cup 154 to the threading shaft 148, while compressed fluid is supplied through conduit 150. In this arrangement the threading clutch is operable to translate a high speed gearing to the threading shaft 148 when it is desired to withdraw the threading die, whereas when the threading die is advanced into the stock the drive shaft rotation is translated via the reducing gear 152.

Figure 2:
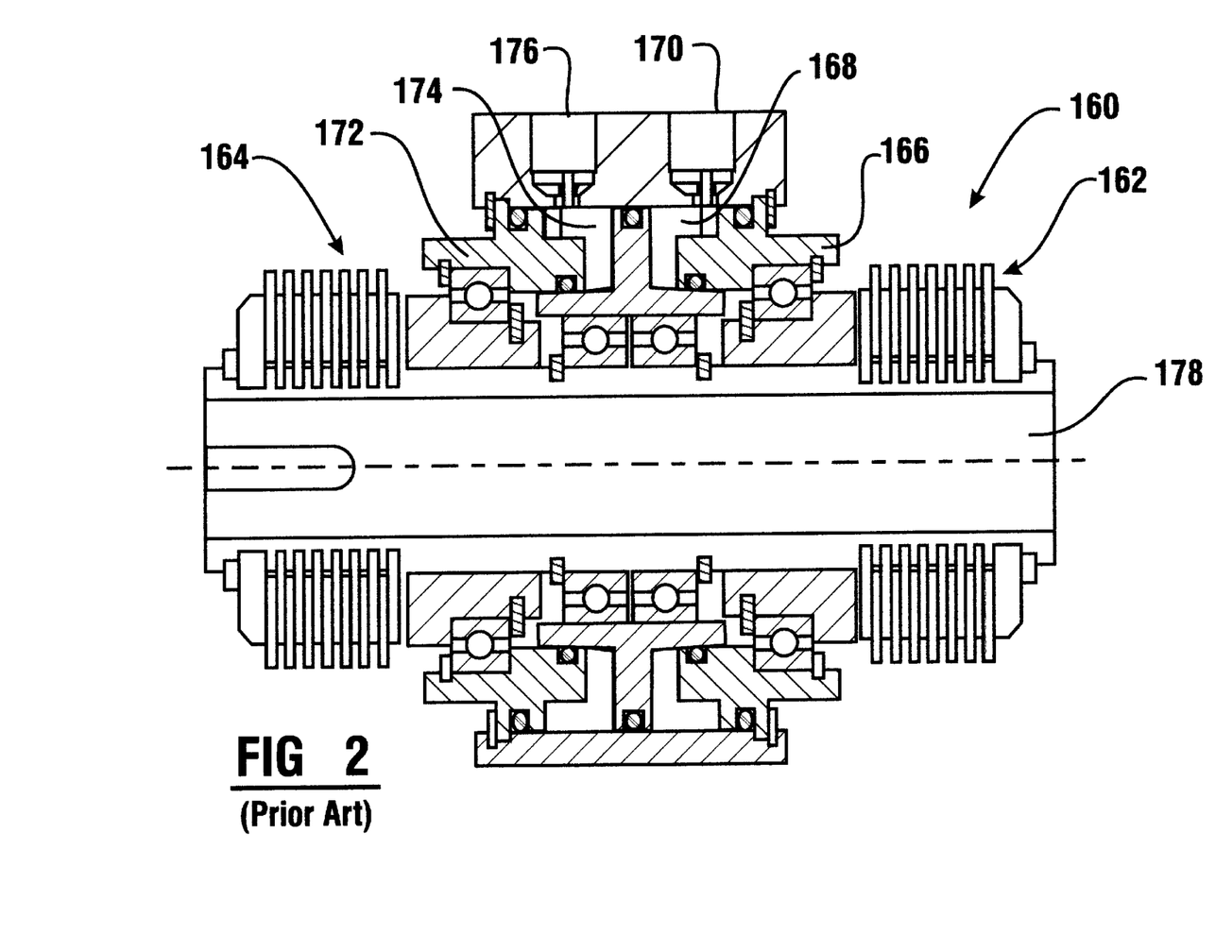
FIG. 2 is a cross sectional side view of a threading clutch machine of the prior art.

Referring now to FIG. 2, there is shown a cross sectional view of a prior art threading clutch. Specifically the threading clutch shown in FIG. 2 is that which is found in the National Acme 7/16th inch RA-6 bar machine. The actual size of this prior art threading clutch is approximately 2.5 inches in diameter and approximately 3.5 inches in length.

The threading clutch 160 comprises a first packet of friction disks 162 which are operable to engage the drive cup 146 of threading clutch 140 shown in FIG. 1. The threading clutch 160 further includes a second packet of friction disks 164 which is operable to engage the drive cup 154 of the threading clutch 140 shown in FIG. 1. Each packet of friction disks is operable to engage their respective drive cups when they are compressed. The threading clutch further includes a first piston 166 which is operably connected to the first packet of friction disks 162. The first piston 166 is slidably positioned within a first cavity 168 which communicates with a first port 170. Similarly the second packet of friction disks 164 are compressed via a second piston 172 which is housed within a second cavity 174 which communicates with a second port 176. Each of the drive cups 146 and 154 are engagably rotated with the shaft 178 by selectively supplying either first port 170 or the second port 176 with compressed fluid. The compressed fluid fills the respective cavity forcing the piston outward which causes the packet of friction disks to be compressed causing each of the friction disks, which are positively engaged with the drive cup to be rotated with the shaft 178.

There are several problems associated with the design and operation of the prior art threading clutch 160. The first problem is a lack of static torque capacity produced by the packets of friction disks. Torque capacity is a measure of the ability of the friction disks to translate the rotation of the shaft to the drive cups. The measure of torque capacity is that level at which the friction disks slip and fail to efficiently transfer the rotational power of the shaft. In this particular design the lack of torque capacity is due to the small piston area used to compress the packets of friction disks. The first and second pistons 166 and 172 use a small fraction of the available cross sectional diameter of the threading clutch 160 for purposes of supplying the force of compression for the friction disks.

Another major draw back with the prior art threading clutch design is that it is desirable to have the friction disks release the drive cups when the fluid pressure is vented from the respective piston cavity. In the prior art design the friction disks are prone to binding causing grinding and reduction of gear life.

Thus there exists a need in the prior art for a threading clutch apparatus which reliably translates the rotation of the shaft to the desired drive cup.

DISCLOSURE OF THE INVENTION

The object of the present invention is to provide an air threading clutch apparatus which is of a small size and which is operable within a National Acme 7/16th inch RA-6 bar machine.

A further object of the present invention is to provide an air threading clutch apparatus in which the torque capacity is increased to facilitate the use of larger threading bits.

A further object of the present invention is to provide an air threading clutch apparatus in which the piston area is maximized.

A further object of the present invention is to provide an air threading clutch apparatus which is quick releasing and quick engaging.

A further object of the present invention is to provide an air threading clutch apparatus which is operable at high compressed air pressures.

Further objects of the present invention will be made apparent from the following Best Modes for Carrying Out Invention and the appended claims.

The foregoing objects are accomplished in the preferred embodiment of the present invention by a threading clutch apparatus for a multiple spindle machine. The threading clutch apparatus is driven by a shaft of the multiple spindle machine to turn a first gear in a first direction and a second gear in a second direction.

The shaft extends along a longitudinal direction and comprises a generally annular hub. The hub also extends in the longitudinal direction and is positioned in a generally surrounding relation of the shaft. The hub comprises a spline or keyway for acceptance of a mating protrusion on the shaft. Rotation of the shaft is translated to the hub via the coupling of the protrusion and the hub keyway. The hub further comprises at least one rib extending along the longitudinal direction along the outside length of the hub.

The threading clutch apparatus further comprises a generally cylindrical housing. The housing is positioned generally surrounding the hub. The position of the housing is fixed relative the rotating hub by bearings. The housing comprises an exterior outside face which extends in the longitudinal direction. The housing further comprises an annular first and second face which both extend radially to the longitudinal direction, with the second face being disposed from the first face in the longitudinal direction. The housing also comprises first and second ports which extend radially in the outside face. The first port communicates with a first passage which extends from the first port to the first face. The second port similarly extends from the second port to the second face. The second port communicates with a second passage which extends from the second port to the second face. Both the first port and the second ports are adapted for connection with a compressed fluid supply. The housing also includes a lip portion which extends longitudinally outward from both the first face and the second face.

The threading clutch apparatus further includes an annular first piston which is slidably positioned next to the housing. The first piston comprises a central portion which extends generally in the radial direction and opposed to the first face. The first piston further includes a first sealing portion which extends from the central portion in the longitudinal direction and is positioned opposed to the annular face. The first piston also includes a second sealing portion also extending from the central portion in the longitudinal direction and positioned opposed to the lip portion. The first piston is movable on the housing and a first cavity is formed by an inside surface of the central portion of the first piston, the first face, the lip portion and an inside surface of the second sealing portion of the first piston. The first cavity fluidly communicates with the first passage. The first cavity communicates with the compressed fluid supply and the first cavity is operable to be expanded by the compressed fluid when the compressed fluid is accumulated within the cavity forcing the first piston away from the first face.

The threading clutch apparatus also includes a annular second piston which is slidably positioned next to the housing on a side of the housing opposed to the above described first piston. The second piston comprises a mirror image structure of the first piston which comprises a central portion which extends generally in the radial direction opposed to the second face. The second piston further includes a first sealing portion extending from the central portion in the longitudinal direction and positioned opposed to the annular face, and a second sealing portion extending from the central portion in the longitudinal direction and positioned opposed to the lip portion. The second piston is movable on the housing and a second cavity is formed by an inside surface of the central portion of the second piston, the second face, the lip portion and an inside surface of the second sealing portion of the second piston. The second cavity fluidly communicates with the second passage, whereby when the second cavity communicates with the compressed fluid supply the second cavity is expanded by forcing the second piston away from the second face.

The threading clutch apparatus further includes two sets of a plurality of friction disks. Each set of friction disks extends about the hub in the radial direction and are longitudinally disposed from each other about the housing. The plurality of first friction disks comprise a plurality of first driving disks. Each of the driving disks is sized to engage the hub about the circumference of the surface of the hub. Each of the first driving disks contains a keyed area which is shaped to accept at least one rib of the hub, therefore each of the first driving disks are positively driven by the rotation of the hub on the shaft. The plurality of the friction disks further comprise a plurality of first driven disks. The plurality of first driven disks are operatively connected to the first gear. Each of the first driven disks are positioned adjacent one or two first driving disks. Each of the driving disks is sized to not engage the hub at any point about the circumference of the hub. Each driven disks comprises a protruding area extending about the outer edge of each of the driven disks. This protruding area is adapted to operatively engage the first gear. The plurality of first friction disks further comprise a plurality of springs wherein each said spring is positioned in a space between each said first driven disk and said hub. Each spring acts to bias each adjacent first driving disk away from said driven disk. In operation, when the plurality of first friction disks are compressed by the piston force, each first driven disk is engaged by at least one first driving disks. The rotation of the shaft is then translated through each first driving disks to each first driven disk.

The threading clutch further includes an annular first thrust member and an annular first back member. The plurality of first friction disks are interposed between the first thrust member and the first back member. Each first thrust member and first back member comprise a keyed area. Each keyed area is shaped to accept at least one rib of the hub wherein both the first thrust member and the first back member are positively driven by the rotation of the hub on the shaft.

The first thrust member is slightly positioned about the hub between the first piston and the plurality of first friction disks. The first thrust member is positioned on the threading clutch apparatus to translate the force of the first piston to the plurality of first friction disks. The rotation of the first thrust member on the hub relative to the adjacent fixed position of the piston is allowed by an annular first thrust bearing interposed between the first thrust member and the outward face of the first piston.

The position of the first back member is fixed on the hub to support the compression of the plurality of first friction disks when the first thrust member is moved toward the plurality of first friction disks by the first piston.

The threading clutch apparatus further includes a plurality of second friction disks, an annular second thrust member and an annular second back member, all positioned on the hub adjacent the second piston in a mirror arrangement to the above described first friction disk, first thrust member and first back member.

The operation of the threading clutch apparatus is initiated by the flow of pressurized fluid to the threading clutch from the compressed fluid supply. Initially when neither the first gear or the second gear is engaged the shaft runs free within the threading clutch apparatus. The rotating shaft also rotates the hub, and the first and second thrust members, the first and second back members, and the plurality of first and second driving disks all of which are positively connected to the hub via at least one rib. The plurality of first and second gear members are not rotated by the hub, instead remain stationary relative the adjacent driving disks.

When it is desired to engage the first gear and translate the rotation of the shaft to the first gear, compressed fluid is supplied to the first port and flows through the first passage and into the first cavity. The pressure of the fluid acting on the central portion of the first piston forces the first piston away from the housing expanding the first cavity. The large surface area of the central portion of the first piston is acted upon by the pressure of the fluid within the first cavity and is forced against the first thrust member. The first thrust member translates the force applied by the first piston and moves in the longitudinal direction towards the plurality of first friction disks. The motion of the first thrust member in this direction decreases the distance between the first thrust member and the first stop member. This decreased distance forces each of the plurality of first friction disks to become engaged with the adjacent friction disks. Each first driven disks is fixed between adjacent first driving disks and the rotational force of the driving disks is translated to each of the driven disks causing them to rotate in synchronous motion with the shaft. The rotating plurality of first driven disks in turn translate rotation to the first gear, moving it in synchronous rotation with the shaft.

The springs which are interposed between the plurality of first driving disks are compressed when the plurality of friction disks are compressed by the first piston. When the piston force is released by the venting of the compressed fluid within the first cavity, the springs act to spread apart the adjacent driving disks, expanding the plurality of friction disks to their original area on the hub and forcing the first thrust member back against the first piston to compress the first cavity by driving the first piston against the housing, expelling the accumulated fluid back through the first passage. When the fluid is vented and the spring acts to spread the driving disks, each driven disk is released from engagement from the adjacent driving disks and again allowed to rotate freely. The operatively attached first gear is also then allowed to rotate freely and gears intermeshing with the first gear can cause the first gear and the driven disk to flow to a stop despite the continued rotation of the shaft.

The operation of the threading clutch apparatus also allows for a second piston to operatively engage the second driven disks and second gear in a similar fashion to the operation described above with relation to the first piston and first driven disk and first gear. The operation is such that either of the driven disk can be engaged simultaneously or alternatively depending on the desired operation of the multiple spindle machine.

BEST MODES FOR CARRYING OUT INVENTION

Figure 3:
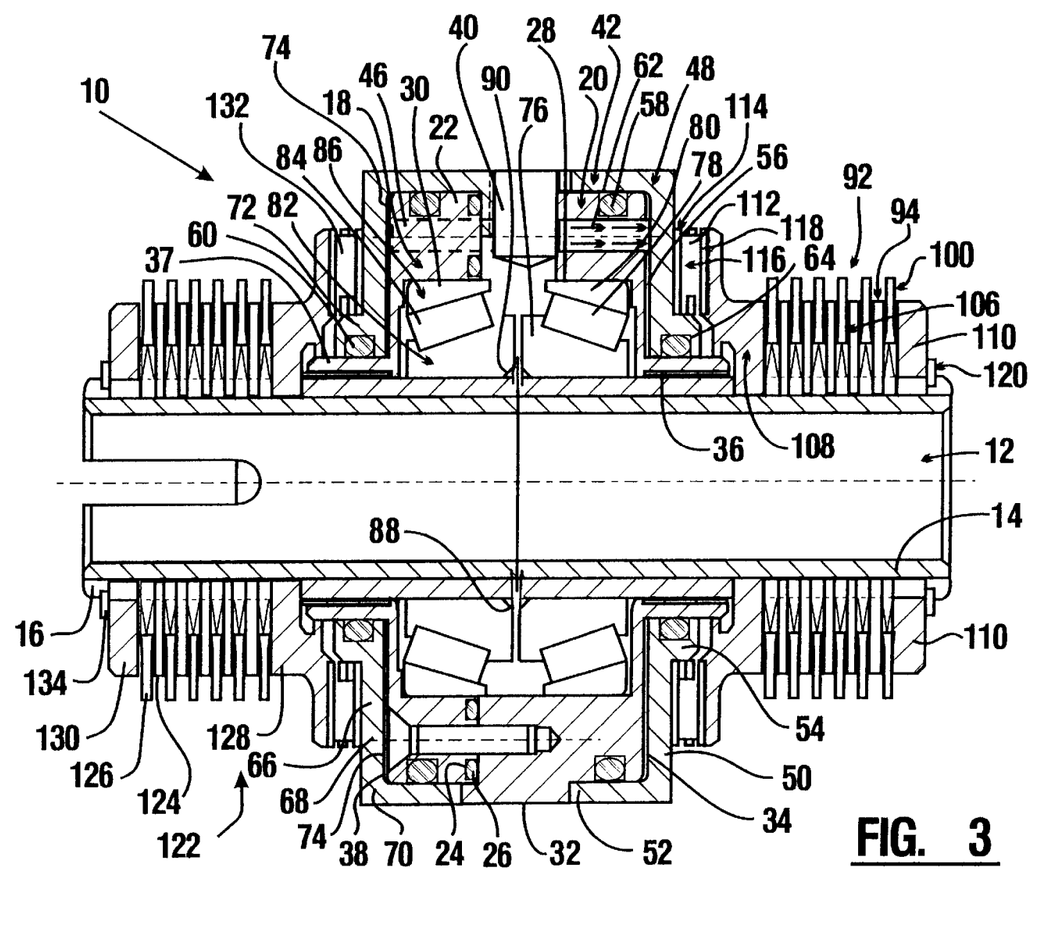
FIG. 3 is a cross sectional side view of the threading clutch machine of the present invention.

Referring now to the drawings and particularly to FIG. 3, there is shown the threading clutch apparatus 10 of the present invention. The threading clutch apparatus is driven by a shaft 12. The shaft extends along a longitudinal direction and can be rotated in either a first direction or a second direction. The shaft is operatively connected and driven by a main motor (not shown) of the multiple spindle machine.

The threading clutch apparatus includes and is orientated about a generally annular hub 14. The hub extends in the longitudinal direction and is positioned in a generally surrounding relation of the shaft. The hub preferably comprises a spline or keyway for acceptance of a mating protrusion on the shaft. The mating of the shaft protrusion (not shown) and the spline (not shown) of the hub provides a positive connection for the translation of the rotational motion of the shaft to the hub. The hub further comprises a set screw (not shown) positioned to extend through the hub to engage the exterior surface of the shaft 12. The set screw acts to further positively engage the shaft and to prevent movement of the hub relative to the shaft in the longitudinal direction. The hub 14 further comprises a plurality of ribs 16. Each rib extends along the longitudinal direction along the entire length of the hub. Each rib acts to positively engage other components of the threading clutch apparatus as will be described below. In the preferred embodiment the rib is generally square shaped in cross section, however other shape configurations can also be utilized.

The threading clutch apparatus further includes a generally cylindrical housing 18. For purposes of assembling the threading clutch, the housing is composed of a first part 20 and a second part 22. Both parts are configured for mating into a single fluid tight component. The second part contains grooves 24 in which are positioned annular O-rings 26 for purposes of providing fluid sealing to the assembled housing. The housing 18 is positioned on the hub in generally surrounding relation. The position of the housing is fixed rotationally and in the longitudinal direction. The fixed housing is isolated from the rotating hub by two sets of bearings 28 and 30, which are described in greater detail below.

The housing 18 includes an outside face 32 extending in the longitudinal direction. The outside face extends about the circumference of the housing. The housing further includes an annular first face 34 which extends generally radially to the longitudinal direction and the outside face 32. The first face 34 extends from the outside face 32 to a lip portion 36. Lip portion 36 is a thin extension of the housing extending in the longitudinal direction. The outside face of the lip portion extends adjacent the hub 14. The housing is supported on the bearings so as to allow the lip portion to surround but not engage the adjacent hub surface.

The housing further includes an annular second face 38 which extends generally radial to the longitudinal direction and is disposed from the first face in the longitudinal direction. The second face 38 extends between the outside face 32 and a lip portion 37.

The housing further contains a first port 40 which extends radially in the outside face and communicates with a first passage 42 which extends from the first port to the first face 34. The housing further includes a second port (not shown) extending radially in the outside face communicating with a second passage 46 which extends from the second port to the second face. Both the first port and the second port are adapted for connection with a compressed fluid supply.

The threading clutch apparatus further includes a first piston 48 which is slidably positioned adjacent the housing. The first piston is annularly shaped and includes a central portion 50 which extends generally in the radial direction and is positioned opposed to the first face. A first sealing portion 52 extends from the central portion in the longitudinal direction and is positioned on the first piston opposed to the outside face of the housing. The second sealing portion 54 extends from the central portion and is in the longitudinal direction and is disposed from the first sealing portion in the radial direction. The second sealing portion is positioned on the first piston opposed to the lip portion 36. The first piston moves relative the housing by the sliding engagement of the interface of the first sealing portion on the outer face of the outside face 32 and the engagement of the second sealing portion with the lip portion 36.

A first cavity is formed by the inside surface of the central portion of the first piston, the first face 34, the lip portion 36 and an inside surface of the second sealing portion 54 of the first piston. Volume of the first cavity increases and decreases with the position of the first piston relative the housing. Independent of the first piston's position relative the housing, the first cavity 56 communicates with the compressed fluid supply via the first passage 42 and the first port 40. The first cavity is sealed via sealing means comprising O-rings 58 and 60. The housing includes a groove 62 which houses O-ring 58 and the second sealing portion of the first piston includes a groove 64 which houses O-ring 60. When the first cavity communicates with the compressed air supply, the first cavity is expanded by forcing the first piston away from the first face. The compressed fluid supply is retained within the first cavity by the O-rings 58 and 60.

The pressure of the compressed fluid within the first cavity is translated into a force moving of the first piston. This force is a function of both the fluid pressure and the surface area of the first face 34. In the present invention this surface area is maximized by having the first piston extend from the hub to the outer surface of the housing.

The sealing means for the first cavity allow for fluid pressure up to 100 psi compared to prior art maximum pressures of 60 psi. The fluid pressure is also maximized resulting in maximum motive force acting on the first piston.

The threading clutch further includes an annular second piston 66 which is slidably positioned next to the housing on a side opposed to the above described first piston. The second piston comprises a central portion 68 which extends generally in the radial direction and is positioned opposed to the second face 38 of the housing. The second piston further comprises a first and second sealing portion 70 and 72. The first sealing portion 70 extends from the central portion in a longitudinal direction and is positioned opposed to the outside face 32 of the housing. The second sealing portion 72 extends from the central portion in the longitudinal direction and is positioned opposed to the lip portion 37. The second piston 66 is movable on the housing and a second cavity 74 is formed by the inside surface of the central portion of the second piston, the second face, the lip portion and the inside surface of the second sealing portion of the second piston. When the second cavity communicates with the compressed fluid supply the second cavity is expanded by forcing the second piston away from the second face.

As described above, the fixed housing is isolated from the rotating hub via a first bearing 28 and a second bearing 30. The first bearing comprises an inner race 76 which extends about the circumference of the hub. The first bearing further includes a plurality of taper roller bearings 78 which extend adjacent each other within the inner race about the circumference of the inner race. An outer race 80 is supported from the plurality of roller taper bearings and itself supports the housing 18. The outer race is adapted to conform with the shape of the housing and is secured thereto with conventional fastening methods.

The second bearing 30 comprises a mirror image of the above described first bearing and comprises an inner race 82, a plurality of tapered roller bearings 84 and an outer race 86. The inner race 76 is spaced from the inner race 82 of the second bearing via a retaining ring 88. Retaining ring extends about the outer surface of the hub and is fitted within a keyed area 90 of the rib 16. The retaining ring 88 acts to maintain the longitudinal position of the housing and other supported components by its engagement with the first and second bearing and with a keyed area 90 within the hub.

Figure 5:
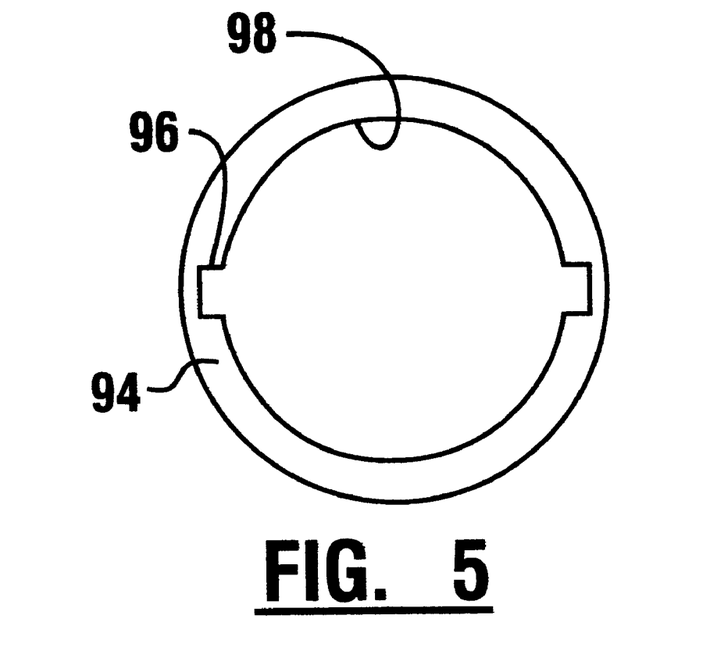
FIG. 5 is a plan view of the driving disks of the present invention.

The threaded clutch apparatus further includes a plurality of first friction disks 92. Each of the first friction disks extend about the hub generally perpendicular to the longitudinally extending shaft. The first friction disks 92 comprise a plurality of first driving disk 94. These driving disks are shown in plan in FIG. 5. Each driving disk 94 is sized to engage the hub about the circumference of the outer surface of the hub. Each driving disk 94 contains a keyed area 96. Each keyed area is shaped to accept the protruding ribs of the hub. An inner surface 98 of the driving disk 94 is sized to closely mate with the outer surface of the hub. The mating of the protruding ribs and the keyed areas of the driving disk allow for the positive driving of each driving disk by the rotation of the hub on the shaft.

Figure 4:
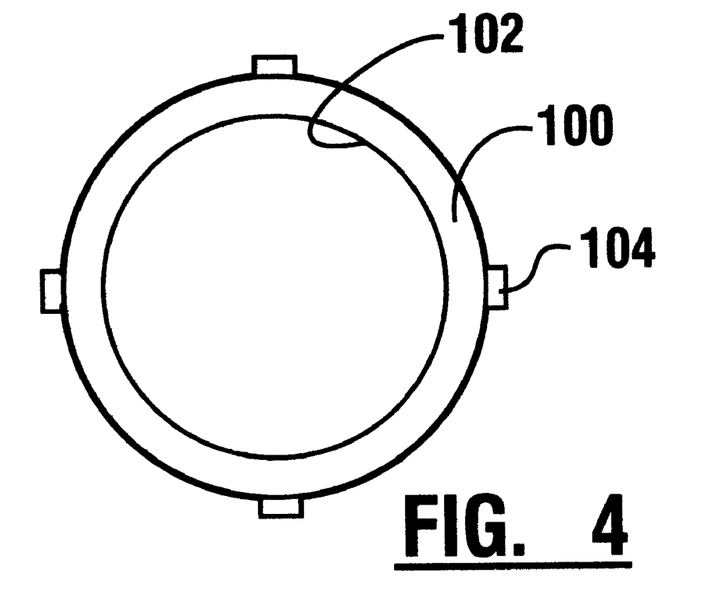
FIG. 4 is a plan view of the driven disks of the present invention.

The first friction disks further comprise a plurality of first driven disks 100. A plan view of the driven disk 100 is shown in FIG. 4. An inner surface 102 of the driven disk is sized so that the driven disk does not engage any part of the revolving hub. Each driven disk includes a plurality of protruding areas 104 which are engaged by a drive cup (not shown), which is engaged by the first gears (not shown). Each driven disk is positioned between or adjacent to a driving disk 100. The adjacent surfaces of the driving and driven disks are adapted to produce a high friction coefficient when the surfaces are engaged.

The first friction disk 92 further comprises a plurality of springs 106. Each spring is positioned in the space between each of the driven disk 100 and the hub 14. Each spring acts to bias each adjacent first driving disk away from the adjacent driven disk. When the plurality of first friction disk are compressed by the thrust force of the first piston, each of the springs are compressed by the adjacent driven disks and each first driven disk is engaged by at least one first driving disk. When each driving disk is so engaged, the rotation of the shaft is translated through each driven disk. When the thrust force of the first piston is released, the springs act to expand the space between the adjacent driving disks allowing the driven disks to again rotate freely.

The threading clutch apparatus further includes an annular first thrust member 108 and an annular first back member 110. The plurality of first friction disks are interposed between the first thrust member and the first back member. Both the first thrust member and the first back member comprise a keyed area (not shown). Each keyed area is shaped to accept rib 16 of the hub. Mating between the keyed area and the rib allows both the annular first thrust member and the annular first back member to be positively driven by the rotation of the hub on the shaft.

The first thrust member 108 is slidably positioned about the hub between the first piston and the first friction disks. The first thrust member is positioned on the hub to translate the force of the first piston to the plurality of the first friction disks. The rotation of the first thrust member relative the fixed position of the first piston is allowed by an annular first thrust bearing 112. The first thrust bearing 112 comprises a thrust bearing race 114 which is positioned adjacent to and in engagement with the first piston. A first race is supported from the second sealing portion and supports a plurality of cage sealed and lubricated bearings 116. The bearings 116 are also supported by a second thrust race 118 which is positioned on the first thrust member 108 and rotates therewith.

The first back member 110 is fixed on the hub in the longitudinal position to support the compression of the first friction disk when the first thrust member is moved towards the plurality of first friction disk by the first piston. As described above, the first back member 110 rotates with the shaft and with the first thrust member 108 acts to frictionally engage the first driven disk 100 when the plurality of first friction disk 92 are compressed. The longitudinal position of the first back member 110 is maintained via a retaining ring 120. The retaining ring is fixed on the hub by clipping onto the rib 16.

The threading clutch apparatus further includes a plurality of second friction disks 122 which extend about the hub in the radial direction on a side of the threading clutch opposed to the plurality of first friction disk 92. The second friction disk comprise a plurality of second driving disks 124 which substantially comprise the driving disk shown in FIG. 5. Each second driving disk is sized to engage the hub about the circumference of the hub and includes a keyed area which mates with the rib of the hub for this purpose. Each second driving disk is positively driven by the rotation of the hub on the shaft.

The plurality of second friction disk further comprise a plurality of second driven disks 126 which substantially comprise the driven disk shown in FIG. 4. Each of the second driven disk are operatively connected to the second gear via a drive cup which is not shown. Each of the second driven disk are positioned between one or two second driving disk. The second friction disk further include a plurality of springs, each positioned in a space between each second driven disk and the hub. Each spring acts to bias each of the adjacent driving disk away from said driven disk. When the plurality of second friction disk are compressed by the second piston force, each of the second driven disk is engaged by at least one second driving disk. When compressed, the rotation of the driving disk is translated by friction to each driven disk translating the rotation of the shaft through each driven disk to the second gear.

The plurality of second friction disk 122 is bounded by an annular second thrust member 128 and an annular second back member 130. Both the second thrust member and the second back member comprise a keyed area not shown. Wherein each keyed area is shaped to accept the rib 16 of the hub. The mating between the rib and the keyed area allows both the second thrust member and the second back member to be positively driven by the rotation of the hub on the shaft.

The second thrust member 128 is slidably positioned on the hub between the second piston and the second friction disk to translate the force of the second piston to the plurality of the second friction disk. The rotation of the second thrust member relative the fixed position of the second piston is allowed by an annular second thrust bearing 132. The second thrust bearing is a mirror image of the thrust bearing assembly 112.

The position of the second back member 130 is fixed on the hub longitudinally by a retaining ring 134. The fixed longitudinal position of the second back member allows the compression of the second friction disk when the second thrust member is moved towards the second friction disk by the second piston.

The operation of the threading clutch apparatus 10 is initiated by the flow of pressurized fluid to the threading clutch from a compressed fluid supply. Initially when either the first gear or second gear is engaged the shaft 12 runs free within the threaded clutch apparatus. The rotating shaft also rotates the hub 14, the first thrust member 108, the second thrust member 128, the first back member 110 and the second back member 130, the plurality of first driving disks 94 and the plurality of second driving disks 124 which are positively connected to the hub via the rib 16.

The plurality of first driven disks 100 and second driven disks 126 are not rotated by the hub and instead remain free from rotation relative the adjacent driving disks. Likewise the housing and first and second pistons also remain stationary relative the rotating shaft 12.

When it is desired to engage the first gear and translate the rotation of the shaft to the first gear compressed fluid is supplied to the first port 40 and flows to the first passage 42 and into the first cavity 56. The pressure of the fluid acting on the central portion 50 of the first piston 48 forces the first piston away from the housing 18 expanding the first cavity. The large surface area of the central portion of the first piston is acted upon by the pressure of the fluid within the first cavity and is forced against the first thrust member 108. The first thrust member translates the force supplied by the first piston and moves in the longitudinal direction towards the plurality of the first friction disk 92. The first thrust member forces the plurality of first friction disk against the first back member 110 and decreases the longitudinal distance between the adjacent first friction disks. This decreased distance forces each of the plurality of first friction disk to become engaged with the adjacent friction disk. Each first driven disk 100 is fixed between an adjacent first driving disk 94 and the rotational force of the driving disk is translated to each of the first driven disk causing them to rotate in synchronous motion with the shaft. The rotating plurality of first driven disk in turn translate rotation to the first gear, moving it in synchronous rotation with the shaft.

The springs 106, which are interposed between the plurality of first driven disk, are compressed when the plurality of friction disks are driven by the first piston. When the first piston force is released by the venting of the compressed fluid from the first cavity, springs act to spread apart the adjacent first driving disks 94, expanding the plurality of friction disk 92 to the original area on the hub and forcing the first thrust member 108 against the first piston 48. This spring force compresses the first cavity by driving the first piston against the housing expelling the accumulated fluid back through the first passage 42. When the fluid is vented from the cavity and the springs act to spread the driving disks, each first driven disk 100 is released from engagement from the adjacent first driving disk and again allowed to rotate freely independent of the rotation of the adjacent driving disk. The operatively attached first gear is also then allowed to rotate freely and independent from the shaft and gears intermeshing with the first gear can control the speed of the first gear.

When it is desired to engage the second gear and translate the rotation of the shaft to the second gear the compressed fluid is supplied to the second port and flows to the second passage 46 and into the second cavity 74. Pressure of the fluid acting on the central portion 68 of the second piston forces the second piston away from the housing expanding the second cavity. The outer surface area of the central portion of the second piston is acted on by the pressure of the fluid in the second cavity and is forced against the second thrust member 128. The second thrust member translates the force supplied by the second piston and moves in the longitudinal direction towards the plurality of the second friction disk 122. The motion of the second thrust member in this direction decreases the distance between the second thrust member and the second back member 130. This decreased distance forces each of the plurality of second friction disk to become engaged with the adjacent friction disk. Each second driven disk 126 is fixed between adjacent second driving disk 124 and the rotational force of the second driving disk is translated to each of the second driven disk causing them to rotate in synchronous motion with the shaft 12. The rotating plurality of second driven disk 126 in turn translate rotation to the second gear, moving it in synchronous rotation with the shaft. Once the compressed fluid within the second cavity is vented the springs interposed between the adjacent driving disk act to compress the second cavity and release the second driven disk allowing them to rotate independently of the second driving disk.

The outer diameter of the threading clutch apparatus is sized to be interchangeable with the existing threading clutches of the National Acme 7/16th inch RA-6 bar machines. However the dimensions of the present invention can be modified to accommodate other machines. The threading clutch apparatus of the present invention provides performance advantages over the prior art National Acme air threading clutch by allowing for higher maximum operating pressures, upward of 100 PSI versus the prior art's 60 PSI. These higher operating pressures translate into higher torque capacities allowing the air driven threading clutch to drive much larger torque requiring threading taps. The innovative design of the first and second pistons increases the piston area of the present invention within the adjacent cavity by 63% relative the prior art National Acme air threading clutch. This increased piston area allows for torque static capacity increases of 20% at the same fluid pressures. For example, at 60 PSI the present invention provides a torque static capacity of 15.3 foot pounds, whereas the prior art is only capable of a torque static capacity of 13 foot pounds. These higher torque capacities also allow for faster machining of bar stock, decreasing the capping times required, thus increasing the total output productivity of the multiple spindle machine. Although the threading clutch apparatus of the present invention has been described with regard to retrofitting an existing machine, the threading clutch apparatus can also be used in new multiple spindle machines in which pneumatic operated disk clutches can be used.

Thus the threading clutch apparatus of the present invention achieves the above stated objectives, eliminates difficulties encountered in the use of prior devices, solves problems and attains the desirable results described herein.

In the foregoing description certain terms have been used for brevity, clarity and understanding. However no unnecessary limitations are to be implied therefrom because such terms are for descriptive purposes and are intended to be broadly construed. Moreover the descriptions and illustrations herein are by way of examples and the invention is not limited to the details shown and described.

Having described the features, discoveries and principles of the invention, the manner in which it is constructed and operated and the advantages and useful results attained; the new and useful structures, devices, elements, arrangements, parts, combinations, systems, equipment, procedures, methods, operations and relationships are set forth in the appended claims.

What is claimed is:

1. A threading clutch apparatus for a multiple spindle machine, comprising:

a shaft extending along a longitudinal direction;

a hub extending in generally surrounding relation relative to the shaft, the hub being in operatively engaged relation with the shaft;

a housing extending in generally surrounding relation relative to the hub, the housing being mounted to remain relatively stationary relative to the machine, the housing having at least one port for receiving a fluid;

a first piston positioned adjacent to the housing and being in fluid communication with the housing, wherein the first piston comprises:

a first central portion, a first hub sealing portion and a first housing sealing portion, wherein the first central portion extends generally radially relative to the shaft, the first hub sealing portion extends generally longitudinally in a first direction adjacent the hub and wherein the first hub sealing portion extends in generally surrounding relation relative to the hub, and wherein the first housing sealing portion extends generally longitudinally in a second direction opposed to the first direction, and wherein the first housing sealing portion extends in generally surrounding relation relative to the housing and is disposed radially outward of the first hub sealing portion;

a second piston positioned adjacent to the housing on an opposite side thereof from the first piston and in fluid communication with the housing, wherein the second piston comprises:

a second central portion, a second hub sealing portion and a second housing sealing portion, wherein the second central portion extends generally radially relative to the shaft, the second hub sealing portion extends in generally the second direction adjacent the hub and wherein the second hub sealing portion extends in generally surrounding relation relative to the hub, and wherein the second housing sealing portion extends in generally the first direction, and wherein the second housing sealing portion extends in generally surrounding relation relative to the housing and is disposed radially outward of the second hub sealing portion; and a first friction disk set and a second friction disk set radially extending about the hub, the first and second friction disk sets each including at least one driving disk and at least one driven disk the first piston being operative to compress the first friction disk set when the first piston is in an expanded position, and the second piston being operative to compress the second friction disk set when the second piston is in an expanded position.

2. A threading clutch apparatus according to claim 1, wherein said housing comprises:
an outside face extending in generally the longitudinal direction;
an annular first face adjacent to the outside face and extending in a direction generally radially relative to the shaft;
an annular second face adjacent to the outside face and extending in a direction generally radially relative to the shaft, the first and second annular faces being longitudinally spaced from each other;
a first port operative to receive a fluid and situated in the outside face, the first port having a passage extending to the first annular face; and
a second port operative to receive a fluid and situated in the outside face, the second port having a passage extending to the second annular face.

3. A threading clutch apparatus according to claim 2, wherein said first and second annular faces each include a lip portion extending adjacent said hub in a direction outwardly from the housing.

4. A threading clutch apparatus according to claim 3, wherein:
the first central portion extends in opposed relation to the first annular face of the housing;
the first housing sealing portion extends generally coaxial with the hub and opposed to the outside face of the housing; and
the first hub sealing portion extends generally coaxial with the hub and opposed to the lip portion of the first annular face of the housing, the first central portion and the first annular face bounding a first cavity wherein the first piston upon receiving a fluid in the first cavity through the passage in connection with the first port slidably moves to the expanded position of the first piston to compress the first friction disk set.

5. A threading clutch apparatus according to claim 4, wherein
the second central portion extends in opposed relation to the second annular face of the housing;
the second housing sealing portion extends generally coaxial with the hub and opposed to the outside face of the housing; and
the second hub sealing portion extends generally coaxial with the hub and opposed to the lip portion of the second annular face of the housing, the second central portion and the second annular face bounding a second cavity, wherein the second piston upon receiving a fluid in the second cavity through the passage in connection with the second port slidably moves to the expanded position of the second piston to compress the second friction disk set.

6. A threading clutch apparatus according to claim 5, wherein each of said driving disks includes means for engaging said hub.

7. A threading clutch apparatus according to claim 6, wherein each of said driven disks include at least one protruding area for engaging a drive cup.

8. A threading clutch apparatus according to claim 7, wherein each of said driven disks include an inner circumferential area larger than an area of said hub so as not to engage said hub.

9. A threading clutch apparatus according to claim 8, wherein each driving disk is biased away from an adjacent driven disk by a spring extending between the adjacent driving and the driven disks.

10. A threading clutch apparatus according to claim 9, and further comprising:
a first thrust member slidably positioned on the hub between the first piston and the first friction disk set;
a first back member portion positioned in supporting connection with the hub, the first friction disk set extending between the first thrust member and the first back member portion, wherein the first back member portion is operative to support the first friction disk set when the first thrust member is moved towards the first friction disk set by the first piston;
a second thrust member slidably positioned in supporting connection with the hub between the second piston and the second friction disk set; and
a second back member portion positioned in supporting connection with the hub, the second friction disk set extending between the second thrust member and the second back member portion, wherein the second back member portion is operative to support the second friction disk set when the second thrust member is moved towards the second friction disk set by the second piston.

11. A threading clutch apparatus according to claim 10, further comprising a first retaining ring positioned in supporting connection with the hub, the first back member portion extending between the first friction disk set and the first retaining ring, and a second retaining ring positioned in supporting connection with the hub, the second back member extending between the second friction disk set and the second retaining ring, whereby the first and second retaining rings are operative to maintain the longitudinal positions of said first and second back members.

12. A threading clutch apparatus according to claim 11, wherein the first thrust member and first back member portion, and the second thrust member and second back member portion each include means for being driven by rotation of the hub on the shaft.

13. A threading clutch apparatus according to claim 1, wherein each driving disk is separated from an adjacent driven disk by a spring extending between each of the driving and the driven disks.

14. A threading apparatus according to claim 12, further comprising a first thrust bearing having a first thrust bearing race positioned adjacent to and in engagement with said first piston, and a second thrust bearing having a second thrust bearing race positioned adjacent to and in engagement with said second piston.

15. A threading apparatus according to claim 2, wherein said housing includes a plurality of bearings for supporting said housing from said hub.

16. A threading clutch apparatus according to claim 1, wherein said plurality of friction disks at one end of said hub in a compressed position engage said at least one gear.

17. A threading clutch apparatus according to claim 16, wherein said plurality of friction disks at the other end of said hub in a compressed position engage said at least second gear.

18. A threading clutch apparatus for a multiple spindle machine, wherein the threading clutch apparatus is driven by a shaft extending along a longitudinal direction, the threading clutch comprising:
a generally annular hub, wherein the hub extends in the longitudinal direction and is positioned in a generally surrounding relation of the shaft, the hub being in operatively engaged relation with the shaft;

a generally cylindrical housing, wherein the housing is in generally surrounding relation relative to the hub and being mounted by bearings to remain relatively stationary in relation to the rotating hub, wherein the housing comprises:

an outside face extending in generally the longitudinal direction, an annular first face adjacent to the outside face and extending in a direction generally radially relative to the shaft, an annular second face adjacent to the outside face and extending in a direction generally radially relative to the shaft, the first and second annular faces being longitudinally spaced from each other, a first port extending radially in the outside face and communicating with a first passage which extends from the first port to the annular first face, a second port extending radially in the outside face and communicating with a second passage which extends from the second port to the annular second face, a lip portion extending longitudinally outward from each of the annular first face and the annular second face, each lip portion extending adjacent the hub;

an annular first piston slidably positioned adjacent to the housing comprising:

a first central portion, a first hub sealing portion and a first housing sealing portion, wherein the first central portion extends generally radially relative to the shaft, the first hub sealing portion extends generally longitudinally in a first direction adjacent the hub and wherein the first hub sealing portion extends in generally surrounding relation relative to the hub, and wherein the first housing sealing portion extends generally longitudinally in a second direction opposed of the first direction, and wherein the first housing sealing portion extends in generally surrounding relation relative to the housing and is disposed radially outward of the first hub sealing portion;

an annular second piston slidably positioned adjacent to the housing on an opposite side from the annular first piston comprising:

a second central portion, a second hub sealing portion and a second housing sealing portion, wherein the second central portion extends generally radially relative to the shaft, the second hub sealing portion extends in generally the second direction adjacent the hub and wherein the second hub sealing portion extends in generally surrounding relation relative to the hub, and wherein the second housing sealing portion extends in generally the first direction, and wherein the second housing sealing portion extends in generally surrounding relation relative to the housing and is disposed radially outward of the second hub sealing portion;

a first friction disk set, wherein the first friction disk set each extends about the hub, wherein the first friction disk set comprises:

a plurality of first driving disks, wherein each driving disk is sized to positively engage the hub about the circumference of the hub, a plurality of first driven disks, wherein the plurality of first driven disks are operatively connected to the first gear, wherein each first driven disk is positioned between first driving disks, wherein each driven disk is sized to not engage the hub at any point about the circumference of the hub, a plurality of springs, wherein each spring is positioned in a space between each first driven disk and the hub, wherein each spring acts to bias each adjacent first driving disk away from the first driven disk; whereby the plurality of first friction disks are compressed by the piston force, and wherein each first driven disk is engaged by at least one first driving disk, whereby the rotation of the shaft is translated through the at least one first driving disk to the first friction disk;

a second friction disk set, wherein the second friction disk set extends about the hub, wherein the second friction disk set comprises:

a plurality of second driving disks, wherein each second driving disk is sized to positively engage the hub about the circumference of the hub, a plurality of second driven disks, wherein the plurality of second driven disks are operatively connected to the second gear, wherein each second driven disk is positioned between two second driving disks, wherein each second driven disk is sized to not engage the hub at any point about the circumference of the hub, a plurality of springs, wherein each spring is positioned in a space between each second driven disk and the hub, wherein each spring acts to bias each adjacent second driving disk away from the second driven disk; whereby the plurality of second friction disks are compressed by the second piston force, and wherein each second driven disk is engaged by at least one second driving disk, whereby the rotation of the shaft is translated through the at least one second driving disk to the second friction disk.

* * * * *